United States Patent [19]

Lee

[11] Patent Number: 5,715,380
[45] Date of Patent: Feb. 3, 1998

[54] IMAGE FORMING APPARATUS AND MULTIUSER IDENTIFICATION PRINTING METHOD THEREFOR

[75] Inventor: Moon-Sik Lee, Suwon, Rep. of Korea

[73] Assignee: SamSung Electronics Co., Ltd., Suwon, Rep. of Korea

[21] Appl. No.: 646,495

[22] Filed: May 8, 1996

[30] Foreign Application Priority Data

Aug. 14, 1995 [KR] Rep. of Korea ............... 25002/1995

[51] Int. Cl.$^6$ ............................................. G06K 15/00
[52] U.S. Cl. ................................. 395/112; 395/114
[58] Field of Search ........................... 395/112, 114, 395/113, 115, 116, 101, 117; 358/440, 402, 407, 468, 434, 435, 436, 438, 439; 347/142; 399/8, 12, 382, 391, 84, 81, 82, 83, 85; 340/825.52, 825.07, 825.06

[56] References Cited

U.S. PATENT DOCUMENTS 4,757,348  7/1988  Rourke et al. ................. 399/84
4,811,111  3/1989  Kurokawa ..................... 358/440
4,843,571  6/1989  Notermans et al. ............. 395/117
4,970,554  11/1990  Rourke ......................... 399/84
5,579,088  11/1996  Ko ............................. 399/12

*Primary Examiner*—Edward L. Coles, Sr.
*Assistant Examiner*—Dov Popovici
*Attorney, Agent, or Firm*—Robert E. Bushnell, Esq.

[57] ABSTRACT

An image forming apparatus having a multiuser identification printing method for printing user identification data on a printout, the image forming apparatus being shared by plural users wherein the image forming apparatus receives data to be printed through an interface thereof, checks whether a print command is received, and when the print command is received, obtains user identification data, which is stored in an external data input device, from the external data input device that has transmitted the data, and prints the received data together with user identification data.

11 Claims, 2 Drawing Sheets

IMAGE FORMING APPARATUS AND MULTIUSER IDENTIFICATION PRINTING METHOD THEREFOR

CROSS REFERENCE TO RELATED APPLICATIONS

This application makes reference to, incorporates the same herein, and claims all benefits accruing under 35 U.S.C §119 from an application entitled *Multiuser Identification Printing Method For An Image Forming Apparatus* earlier filed in the Korean Industrial Property Office on 14 Aug. 1995, which was duly assigned Ser. No. 25002/1995 by that Office.

BACKGROUND OF THE INVENTION

1. Field of the Invention

The present invention relates to an apparatus and printing method therefor for printing an mage, and more particularly to an image forming apparatus and multiuser identification (ID) printing method which can print each user's identification on their respective printouts in order to distinguish each user's printout in an image forming apparatus shared by a large number of users.

2. Description of the Prior Art

Image forming apparatuses are in great demand according to a recent trend towards office automation. A laser beam printer is one example of an image forming apparatus. Providing an image forming apparatus to every user is still an economic burden and is restricted to available space. Consequently, a shared unit which is capable of connecting many users to one image forming apparatus is widely used. That is, each user shares the image forming apparatus, which may be connected to a local area network (LAN). Alternatively, each user shares the image forming apparatus in a parallel or serial form through an additionally provided shared unit. I have discovered that there is a problem, however, when a large number of users do not pick up their respective printouts immediately during printing, and the printouts become stacked on a delivery guide. In a conventional printing method for the image forming apparatus, each user's printout is not separately distinguishable. Hence, a corresponding user needs to search for his/her own printout by checking the contents of each printout in the stack. Moreover, it is difficult to distinguish another users's printouts unless confirmed by the other user.

SUMMARY OF THE INVENTION

An object of the invention is to provide an improved image formation apparatus and process.

It is another object to provide a multiuser identification printing method for distinguishing each user's printout by printing each user's identification code on their corresponding transactional record printed on a print medium by an image forming apparatus, i.e., printer, shared by at least two users.

In accordance with one aspect of the invention, there is provided an image forming apparatus having a multiuser identification printing method, the image forming apparatus being shared by at least two users, wherein the method undergoing the steps of receiving data to be printed through an interface of the image forming apparatus, checking whether a print command is received, and when the print command is received, obtaining user identification data, which is stored in an external data input device, from the external data input device that has transmitted the data, and printing the received data together with user identification data.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following detailed description, many specific details are set forth to provide a more thorough understanding of the present invention. It will be apparent, however, to those skilled in the art, that the present invention may be practiced without these specific details. In other instances, well known circuits have not been described so as not to obscure the present invention.

Figure 1:
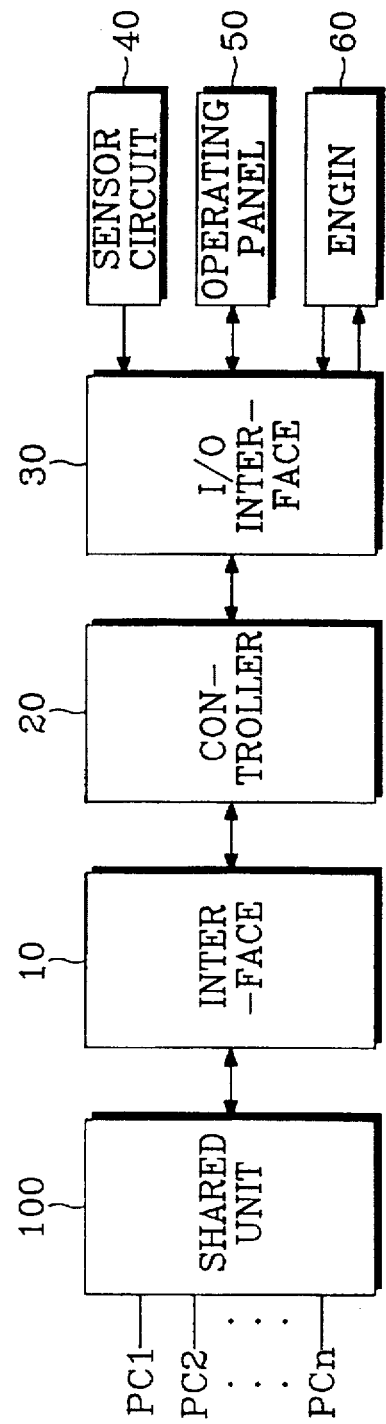
FIG. 1 illustrates a shared unit connection of an image forming apparatus constructed according to the principles of the present invention.

As illustrated in FIG. 1, an image forming apparatus using an electrophotographic process incorporates a parallel shared unit 100 for connecting a plurality of external data input devices, i.e., personal computers, PC1-PCn to an interface 10. Interfaces 10 interface signals transmitted between the image forming apparatus any one of external data input device PC1-PCn. A controller 20 communicates with personal computers PC1-PCn through interface 10, and controls an engine 60 according to various commands received from personal computers PC1-PCn and from an operating panel 50 to implement a variety of functions including printing. An input/output (I/O) interface 30 connected between controller 20 and a sensor circuit 40, operating panel 50 and engine 60 interfaces an input/output signal of controller 20. Sensor circuit 40 drives sensors (not shown) for sensing the operating state of each component of the image forming apparatus, a paper conveying state and the amount of a toner, etc., and supplies output signals of each sensor to controller 20 through I/O interface 30.

Operating panel 50 includes a plurality of keys (not shown) for receiving commands from the user and a display (not shown) for displaying data according to the operation of the image forming apparatus. Engine 60 includes driving mechanism parts (not shown) for conveying a paper and printing an image, and performs printing under the control of controller 20. Parallel shared unit 100 is connected in parallel to personal computers PC1-PCn and provides data from the personal computers PC1-PCn to controller 20 via interface 10.

Figure 2:
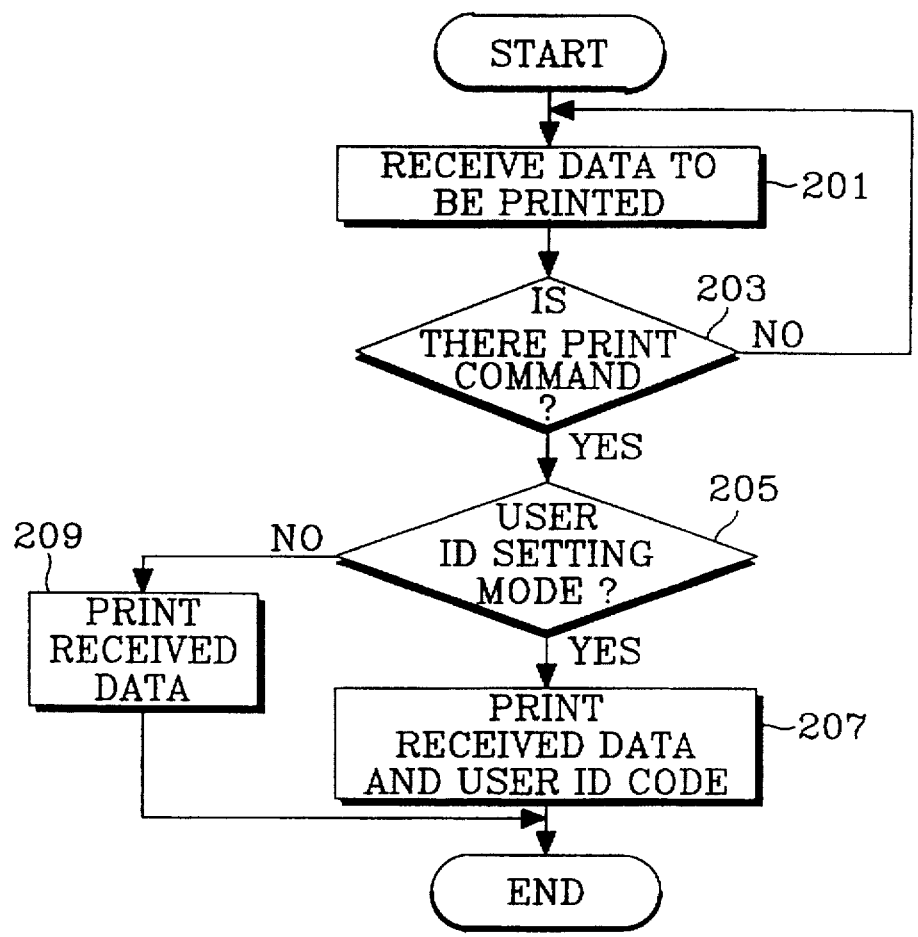
FIG. 2 is a flow chart illustrating a multiuser ID printing procedure according to the present invention.

Referring now to FIG. 2, controller 20 of the image forming apparatus receives data to be printed through shared unit 100 and interface 10, at step 201. A check is made at step 203 to determine whether a print command accompanies the data to be printed. When step 203 determines that a print command is present, controller 20 checks, at step 205, whether a user identification (ID) setting mode for a print control mode has been selected through operating panel 50. When step 205 determines that the user ID setting mode has not been selected controller 20 prints, step 209, only the received data by driving engine 60.

When step 205 determines that the user ID setting mode has been selected, controller 20 checks the personal computer which transmitted the data and reads a user identification code from a nonvolatile memory (not shown), to print the received data together with the user identification code by driving engine 60 in step 207.

Figure 3:
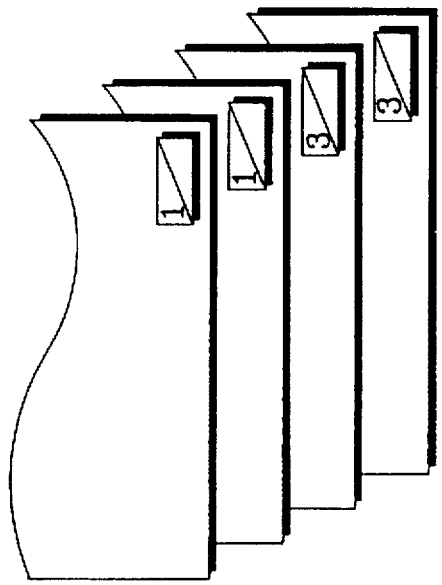
FIG. 3 illustrates one example of the multiuser ID printout according to the present invention.

FIG. 3 illustrates an example of one location, i.e., the bottom right hand corner, on a printout where the user identification code is printed according to the process described above with respect to FIG. 2. Accordingly, the printout is easily searched for from a stack printouts without having to read the contents of the printed received data.

While the present invention has been described with reference to a few specific embodiments, the description is illustrative of the invention and is not to be constructed as limiting the invention. Various modifications may occur to those skilled in the art without departing from the true spirit and scope of the invention as defined by the appended claims.

What is claimed is:

1. A multiuser identification printing method for an image forming apparatus shared by at least two users, said method comprising the steps of:

receiving, from at least one external data input device, data to be printed through an interface of said image forming apparatus;

checking whether a print command is received from said external data input device;

determining whether an user identification mode has been set in said image forming apparatus when said print command is received; and obtaining user identification data stored in a nonvolatile memory of said external data input device, when said user identification mode has been set, and printing said received data together with said user identification data of said external data input device.

2. The method as set forth in claim 1, further comprising the step of:

returning to said receiving step when said print command is not received.

3. The method as set forth in claim 1, further comprising the step of:

printing only said received data when said user identification mode has not been set.

4. A multiuser identification printing method for a printer for recording data received through a shared unit connected to a plurality of personal computers, said method comprising the steps of:

receiving print data transmitted by at least one of said personal computers;

detecting a print command received with said print data;

checking a print control mode to determine whether said print control mode is set to a user identification mode; and checking the personal computer which transmitted said print data to obtain user identification data stored in said personal computer, when said print control mode is set to a user identification mode, and printing said print data together with said user identification data.

5. The method as set forth in claim 4, further comprising the step of:

returning to said receiving step when said print command is not detected.

6. The method as set forth in claim 4, further comprising the step of:

printing only said print data when said user identification mode has not been set.

7. An image forming apparatus having a multiuser identification printing process for recording data received from at least one of a plurality of personal computers, said image forming apparatus comprising:

a shared unit parallel connected to said plurality of personal computers; and means for controlling a print operation by receiving print data transmitted by said at least one of said plurality of personal computers, detecting a print command received with said print data, checking a print control mode to determine whether said print control mode is set to a user identification mode, and checking the personal computer which transmitted said print data to obtain user identification data stored in said personal computer, when said print control mode is set to a user identification mode, and printing said print data together with said user identification data.

8. The apparatus as set forth in claim 7, said means for controlling said print operation comprising:

an operating panel for setting said print control mode;

engine means for printing said print data on a print medium; and a controller for detecting said print command, checking said print control mode, checking the personal computer which transmitted said print data to obtain said user identification data, and controlling said engine means.

9. The apparatus as set forth in claim 8, said means for controlling said print operation further comprising:

first interface means for interfacing said shared unit with said controller; and second interface means for interfacing said controller with said operating panel and with said engine means.

10. The apparatus as set forth in claim 7, said means for controlling said print operation printing only said print data when said print control mode is not set to said user identification mode.

11. The apparatus as set forth in claim 8, said controller controlling said engine means to print only said print data when said print control mode is not set to said user identification mode.

* * * * *